US008170560B2

(12) United States Patent  (10) Patent No.: US 8,170,560 B2
Wu  (45) Date of Patent: May 1, 2012

(54) METHOD AND SYSTEM FOR MANAGING CONTEXT OF MOBILE STATION

(75) Inventor: Jianjun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1008 days.

(21) Appl. No.: 12/128,215

(22) Filed: May 28, 2008

(65) Prior Publication Data

US 2008/0227458 A1 Sep. 18, 2008

Related U.S. Application Data

(63) Continuation of application No. PCT/CN2006/003196, filed on Nov. 28, 2006.

(30) Foreign Application Priority Data

Nov. 29, 2005 (CN) .......................... 2005 1 0126547

(51) Int. Cl.
    *G06F 15/16* (2006.01)
(52) U.S. Cl. ........................................ 455/437; 455/436
(58) Field of Classification Search ............... 455/414.1, 455/436, 437, 445
    See application file for complete search history.

(56) References Cited

U.S. PATENT DOCUMENTS

| 6,253,083 | B1 | 6/2001 | Hacena et al. |
| 7,299,272 | B2 | 11/2007 | Karjanlahti |
| 2002/0049059 | A1 | 4/2002 | Soininen et al. |
| 2002/0052895 | A1 | 5/2002 | Keating |
| 2004/0085942 | A1 | 5/2004 | Le et al. |
| 2007/0298800 | A1 | 12/2007 | Williams et al. |
| 2008/0151837 | A1 | 6/2008 | Soininen et al. |

FOREIGN PATENT DOCUMENTS

| CN | 1376350 A | 10/2002 |
| CN | 1647560 A | 7/2005 |
| CN | 1980463 B | 4/2010 |
| EP | 1 071 302 A2 | 1/2001 |
| WO | WO 00/54523 A1 | 9/2000 |
| WO | WO 01/30030 A1 | 4/2001 |
| WO | WO 2005/112499 A1 | 11/2005 |

OTHER PUBLICATIONS

Written Opinion of the International Searching Authority in corresponding PCT Application No. PCT/CN2006/003196 (Sep. 18, 2008).

Wang et al., "Wireless Internet access based GPRS/ UMTS network and application of MIP technology inside it," Apr. 2003, China Academic Journal Electronic Publishing House, Beijing, China.

*Primary Examiner* — Sam Bhattacharya

(74) *Attorney, Agent, or Firm* — Leydig, Voit & Mayer, Ltd.

(57) ABSTRACT

A method for managing the context of the mobile station (MS) is applied in an MS handover process of a wireless access network. The function entity identification information of acting on the MS is carried in the context of the MS, and the MS addresses based on the function entity identification information and handovers to the target base station. By adding the identifications of various logic entities acting on the MS to the context information of the MS, the correct addressing of these logic entities is ensured during the handover. The different local policies of the source and destination ends are considered during conveying the context of the MS, in which the destination end may update certain context of the MS according to its own local policy during conveying; and the hierarchy of the context conveying of the MS during the handover is also considered.

25 Claims, 4 Drawing Sheets

METHOD AND SYSTEM FOR MANAGING CONTEXT OF MOBILE STATION

CROSS-REFERENCE TO RELATED APPLICATIONS

This application is a continuation of International Patent Application No. PCT/CN2006/003196, filed Nov. 28, 2006, which claims priority to Chinese Patent Application No. 200510126547.7, filed Nov. 29, 2005, entitled "A METHOD AND SYSTEM FOR MANAGING THE CONTEXT OF THE MOBILE TERMINAL," both of which are hereby incorporated by reference in their entirety.

FIELD OF THE INVENTION

The present invention relates to the communication field, and in particular, to a method and system for managing context of mobile station (MS) in a wireless access network.

BACKGROUND OF THE INVENTION

A wireless metropolitan area network standard for the broadband wireless access (BWA) is defined by the IEEE 802.16, in which different physical layer techniques are defined for different frequency bands. The standard is mainly applied in the house, small office/home office (SOHO), remote worker, and small enterprise (SME) oriented markets.

The IEEE 802.16 media access control (MAC) supports a severe subscriber environment, dealing with an application environment with hundreds of subscriber on each channel, and supporting continuous traffic and burst traffic. It is provided with an asynchronous transfer mode (ATM) convergence sublayer and a packet convergence sublayer. Being processed by the convergence sublayer, a plurality of high-level data units is packed as a (MAC) protocol data unit (PDU) for sending, thereby achieving a protocol transparency for the ATM, IP, and Ethernet service.

Figure 1:
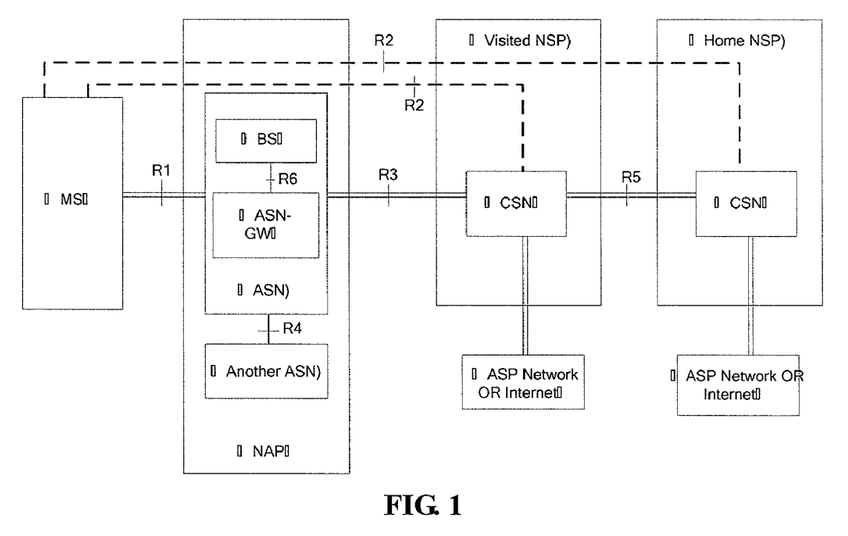
FIG. 1 is a schematic diagram of a WiMAX system.

The worldwide interoperability microwave access (WiMAX) technique is a broadband wireless access technique based on the IEEE 802.16 air interface protocol, and defines the terminal mobility capability supports. As shown in FIG. 1, it is a schematic diagram of a WiMAX paging network. As seen from the FIG. 1, the paging network mainly includes a mobile station (MS), an access service network (ASN), and a connectivity service network (CSN).

The MS is provided for the subscriber to access the WiMAX network.

The ASN defines a network function collection for providing wireless access services for the WiMAX subscriber. The ASN includes a base station (BS) and an ASN gateway (ASN GW). The main functions of the BS include providing an L2 connection between a BS and an MS, a radio resource management, and so on. The main functions of the ASN GW include providing a client function for the MS authentication, authorization, and accounting functions, and providing a relay function (e.g., IP address assignment), or intra-ASN handover of the L3 information for the MS.

The CSN is defined to provide an IP connection service for the WiMAX subscriber. The main functions provided by the CSN include IP address assignment for the MS, Internet access, an authentication, accounting, and authorization (AAA) server or an AAA proxy, a user-based authorization control, and so on.

Figure 2:
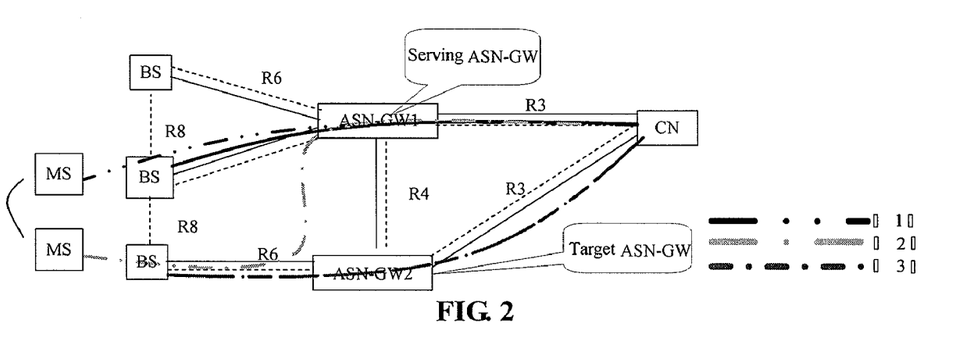
FIG. 2 is a schematic diagram of an MS handover.

Due to the movement of an MS, and connection relationships of the network structure, the handover scenarios are diversified. As shown in FIG. 2, a handover process through a centralized control manner generally requires three steps.

1. The MS communicates with the current serving BS via an air interface, and the serving BS communicates with the current serving ASN-GW1, as shown by the state indicated by the line (1) in FIG. 2.

2. When the MS's movement or resource optimization for the network side cause handover process, and the MS is handed over, the MS communicates with a target BS. The target BS and the serving BS communicate with an identical ASN-GW1, merely the interface R6 needs to be relocated, and the interface R3 remains unchanged during the handover motion, as shown by the state indicated by the line (2) in FIG. 2.

3. When the MS's movement or resource optimization for the network side cause handover process, and the MS is handed over, the MS communicates with the target BS. The target BS communicates with a target ASN-GW2, the original interfaces R6 and R3 both need to be relocated. The signaling interface from the core network to the MS is relocated to the target ASN-GW2. The interfaces involved include R3, R4, and R6. The state indicated by the line (1) directly handovers to the state indicated by the line (3) in FIG. 2.

4. Corresponding to the step 2, after the handover indicated in step 2 is performed, the communication line is shown as the line (2) in FIG. 2. When resource optimization for network side causes a handover process, the state indicated by the line (2) directly handovers to the state indicated by the line (3) in FIG. 2, merely R3 interface is involved, without affecting the air link between the MS and the BNS, and R6 air interface. After the handover is complete, the signaling interface with the core network is entirely relocated to the target BS and the target ASN-GW2, as shown by the state indicated by the line (3) in FIG. 2.

The handover mentioned in the invention not only includes air interface handover caused by an MS's mobility, but also the subscriber air interface handover initiated by the network side and the handover process characterized by mere R3 link handover when resource optimization for the network side occurred. In the network shown in FIG. 2, the state indicated by the line (2) is taken as an initial state, the ASN GW1 or the ASN GW2 may trigger the handover merely involving R3 link, which does not affect the air link between the MS and the BS, and the air link between the BS and R6 of the ASN GW.

In the network shown in FIG. 2, the BS is a logic entity, which generally includes a MAC and PHY entity processing, a service flow management (SFM) entity, a handover (HO) function entity, a data path function entity, a context function entity, and one or more of those function entities.

The ASN-GW is a logic entity, which generally includes an authenticator, a mobile IP (MIP) client, a foreign agent (FA), a paging controller (PC), a service flow authorization (SFA), a relaying handover function entity, a data path function entity, a context function entity, and one or more of those function entity.

Figure 3:
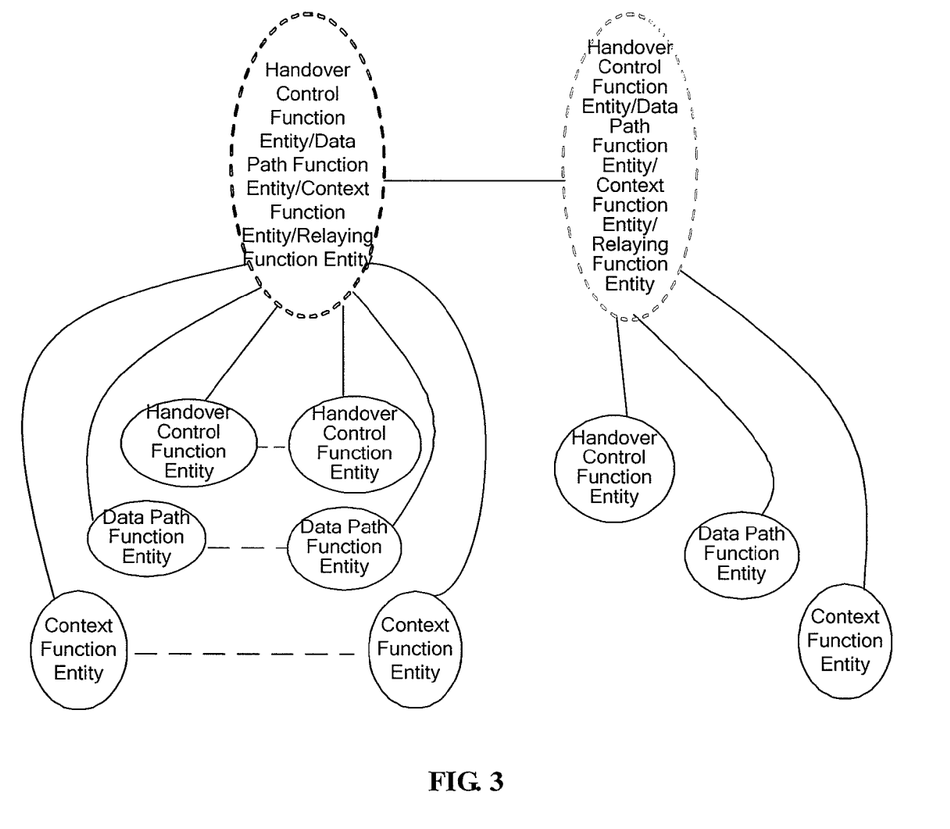
FIG. 3 is a schematic diagram of relationships between various function entities of a base station.

FIG. 3 shows schematic relationships between the above various function entities. The context function entity is divided into a context client and a context server, which are adapted to maintain and manage the session context and other information of the MS. Usually, during the handover process, in order to keep the continuity of the MS session before and after the handover, essential context information should be transmitted at the serving BS side and the target BS side.

1. The current solution mainly defines the following content for the MS session information context:

(1) MS/Session Information:
MS network access identification (MS NAI);
MS MAC address;
Anchor ASN-GW identification associated with the MS;

(2) List Associated with the Service Flow Identification (SF ID):
Service flow (SF) classifier rule;
SF quality of service (SF QoS);
Connection identification (CID) (associated with the SFID);
Data path tagging (ID) information;
Etc.;

(3) R3 (Reference Point 3) Related Information:
Home Agent IP address;
Care-of address (CoA);
Dynamic Host Configuration Protocol (DHCP) server address;
AAA server address;
R3 link status details (to be discussed (TBD));

(4) Security Information:
Security information related to PKMv2;
Security information related to Proxy MIP (if used);
The actual details of the content and elements are TBD.

2. The current solution defines two primitives about MS context conveying, i.e., Context Request message and Context Report message, and involves two function entities, i.e., a context function entity (Context Client) for requesting the MS context and a context function entity (Context Server) for storing the MS context.

(1) Context Request Message

This primitive is mainly provided for one network entity to request specific MS's session information from another network entity.

(2) Context Report Message

This primitive is provided to actively report the MS session context information, or respond to the context request message.

The session information report may be sent to a corresponding network entity as a part of the handover control primitive in a manner of active reporting.

The above technique causes that the MS context information lacks of various anchor function entities identification information acting on the MS, so a correct addressing of these logic entities by the MS cannot be ensured during the handover process.

Furthermore, specific occasion and process of the MS context conveying are not described in the above technique, different local policies of the source and destination ends are not considered during the MS context conveying process, and the destination end may update some MS context according to its own local policy during the conveying process. Furthermore, the hierarchy of the MS context conveying during the handover is not considered in the above solution.

SUMMARY OF THE INVENTION

The embodiments of the present invention provide a method and system for managing a context of a mobile station to solve the problem of incorrect addressing of these logic entities because lack various logic function entity identification information of various logic entities is unavailable in context during the mobile station handover process, and provide various means of the context conveying.

A method for managing a context of a mobile station, applied in a mobile station handover process of a wireless access network, includes: carrying anchor function entity identification information in the mobile station context; and addressing, by a service network connected with the mobile station, corresponding network function entities according to the anchor function entity identification information, to implement data path establishment and service transmission on a target network for the mobile station.

A system for managing a context of a mobile station includes: an access service network adapted to provide an access for a mobile station, and a connectivity service network adapted to provide an IP connection service for the mobile station, wherein the access service network comprises a base station, and an access service network gateway, and the system further includes:

a mobile station anchor function entity information setting unit, adapted to set MS anchor function entity information in a mobile station context during a mobile station handover process; wherein the connectivity service network addresses corresponding network function entity according to the mobile station anchor function entity information, to accomplish data path establishment and service transmission on a target network for the mobile station.

The embodiments of the present invention are to ensure a data path establishment and service transmission on a target network for the mobile station according to the network function entity according to the mobile station anchor function entity information by the service network connected with the mobile station during the handover process of the MS under different base stations.

Furthermore, the embodiments of the present invention provide various manners for the mobile station context conveying, ensuring the flexibility of the handover process and the hierarchy of the mobile station context conveying.

BRIEF DESCRIPTION OF THE DRAWINGS

The present invention will become more fully understood from the detailed description given as follows for illustration only, which thus is not limitative to the present invention, and in which.

DETAILED DESCRIPTIONS OF THE EMBODIMENTS

The detailed description of the present invention is given below by reference to the accompanying drawings.

The embodiments of the present invention are to solve the problem that an MS cannot correctly address the changed logic function entities during the state changing process. According to the present invention, the MS anchor function entity information is obtained when the state of the MS is changed, and according to the MS anchor function entity information, the corresponding function entity is addressed, so as to provide an access service for the MS.

In the embodiments of the present invention, the information about the anchor function entity and the service function entity is described as follows.

The anchor function entity is a function entity that serves the MS, which is generally an interface point of the corresponding service of the MS to the external network. In other words, the information of the MS enters and leaves the local network via these anchor function entities. Furthermore, the anchored also refers to a relatively constant state, so that no migration occurs as possible during the MS movement.

The service function entity is a network entity that serves the MS, which is adapted to manage the behavior of the MS in the current access network, such as managing the handover, managing the service flow, and managing the local resources.

In the prior art, the relationships between various entities are defined in forms of logic function entities, but specific circumstances occurring during the network entity mapping are not considered. For example, as for different ASN profiles, different logic function entities may be arranged on different physical network elements in different ASN profiles. Therefore, a fundamental problem occurs in the inter-working of different ASN profiles. If there are only two physical entities, the BS and the ASN-GW, in one ASN profile, the corresponding logic function entities would be respectively mapped to the two physical entities. On the other aspect, there may be three physical entities in another ASN profile, and the corresponding logic function entities would be respectively mapped to the three physical entities. Therefore, when the MS is handed over between different ASN profiles, it should be interacted in a specific function entity during the handover. A problem would occur if the addressing merely relies on the physical entities associated with the MS, because a specific logic function entity is arranged in different physical entities as for different ASN profiles, the corresponding logic function entities may not be obtained, so that the corresponding content that should be obtained may not be found. Thus, the identifications of various logic function entities involved should be conveyed as the MS context. In this way, the interaction during the handover process may be directly performed in the corresponding logic function entity, thereby ensuring that the inter-working operation between different ASN profiles can be achieved independently of the network structure.

In the case that there is only one ASN profile with, for example, two physical entities both the BS and the ASN-GW, the logic function entities in the BS and the ASN-GW have been defined clearly. For example, an FA, a PMIP Client, an Authenticator for managing the key information and assisting the authentication process, an SFA for service flow authorization, a PC for paging control process, and other logic entities are all located in the ASN-GW. During the MS's movement, it may be handed over between different ASN-GWs, and the logic function entity information acting on the MS involved within the ASN-GWs may not be changed with the ASN-GWs during the handover process. For example, the MS is handed over to a new ASN-GW during the handover process, and the new ASN-GW also has the Authenticator function (for storing the key information of the MS, including MSK, PMK, AK, AK context, and the like). However, since the MS is not re-authenticated in this process, the Authenticator acting on the MS is still in the original ASN-GW, so that the Authenticator in that original ASN-GW becomes the Anchor Authenticator of the MS, and the involved MS key management is still performed the original Anchor Authenticator. During this process, the SFA acting on the MS or the PC is altered to the new ASN-GW. Therefore, in the continuous handover process of the MS, since the triggering instances for the Anchor Authenticator, the Anchor PMIP Client, the Anchor PC, and the Anchor FA acting on the MS are different from each other, each logic function entity acting on the MS may be located in different ASN-GWs when the MS is handed over for many times. Thus, it is necessary to add the identifications of these logic function entities in the MS context, and to convey them during the handover process, for example, the IP address of the current physical entity is added to achieve a clear addressing, thereby ensuring the continuity of the handover process.

Furthermore, in the case that there is only one ASN Profile, the MS enters an idle mode at a particular instance after it has been handed over for many times. The MS context information needs to be stored in the Anchor PC of the MS or stored in a location register (LR) associated with the Anchor PC of the MS, so as to ensure that the serving BS and the serving ASN-GW of the MS can obtain the required information from corresponding entities in accordance with the MS context information, after the MS leaves the idle mode, thereby accomplishing the corresponding path establishment.

An embodiment of the present invention is directed to such case, in which the context information is altered in the MS handover process. The anchor function entity identification information acting on the MS is carried in the MS context, and the service network connected with the MS addresses the corresponding function entities according to the identification information, and accomplishes the data path establishment and service transmission on a target network for the MS.

The function entity identification information acting on the MS may include, but not limited to, the following contents:

Anchor foreign agent identification (FA ID) associated with the MS;

Anchor PMIP client ID associated with the MS (for PMIP);

Anchor Authenticator ID associated with the MS;

Anchor paging controller ID associated with the MS;

Anchor LR ID associated with the MS;

Anchor SFA ID associated with the MS;

Anchor SFM ID associated with the MS;

Anchor radio resource management controller (RRC) ID associated with the MS;

Anchor radio resource management controller agent (RRA) ID associated with the MS;

Anchor data path manager function ID associated with the MS;

Anchor context server ID associated with the MS;

Anchor context client ID associated with the MS; and

Anchor handover controller ID associated with the MS.

Other information may also be carried in the MS context. For example, an SFID is added in the SFID related content, a master session key (MSK), a paired master key (PMK), a PMK sequence number, an authorization key (AK), and an AK context are added in a security related information such as the PKMv2 related security information, and a credential key between a mobile IP proxy mobile node and a mobile IP home agent (PMN-HA key) is added in the PMIP related security information.

The above MS session information context may be transmitted to the target BS side in various scenarios, which are described in detail below.

Figure 4:
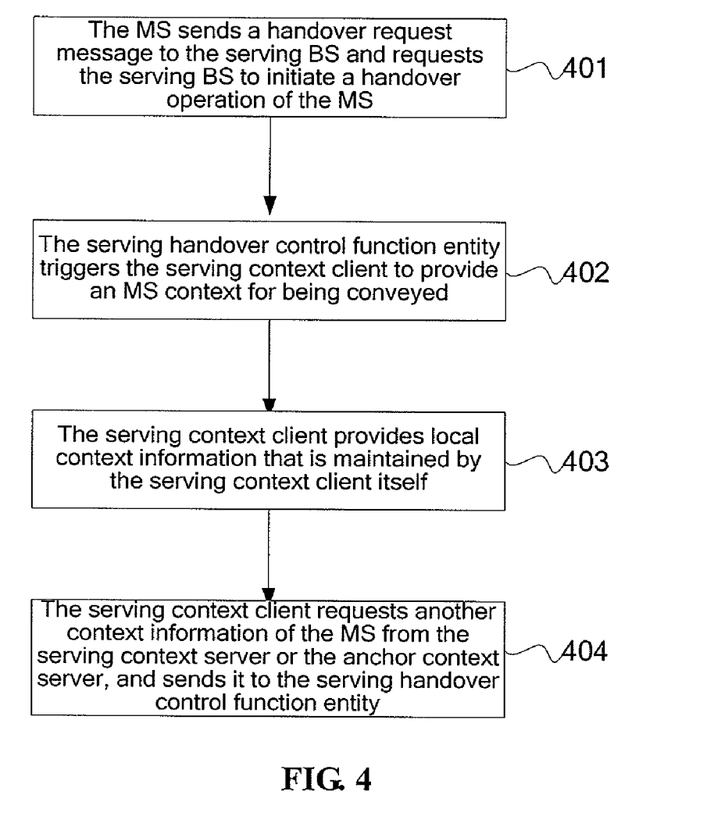
FIG. 4 is a flowchart of an MS context conveying process in a handover preparation stage according to an embodiment of the present invention.

At the handover preparation stage, in order to negotiate whether the handover process is to be performed, e.g., to inquire the target BS about the QoS assurance information that can be obtained by the MS when the MS is handed over to the target BS, and to help the target BS to anticipate and establish the data service path for the MS handover, the serving handover control function entity sends a handover request message to a target handover control function entity, in which the MS context may be sent to the target BS side. The anchor function entity identification information acting on the MS is carried in the MS context. The target BS side performs a corresponding addressing and other operations according to the anchor function entity identification information acting on the MS carried in the context, so as to accelerate the accomplishment of the handover process. As shown in FIG. 4, this process includes the following blocks.

Block 401: The MS sends a handover request message to the serving BS, requesting the serving BS to initiate a handover operation for the MS.

Block 402: The serving handover control function entity triggers the serving context client to provide the MS context for being conveyed.

The serving BS receives the handover request message of the MS, the serving handover control function entity in the serving BS triggers the serving context client to provide the MS context to transmit, before sending the handover request message to the target handover control function entity, so as to assist the handover process and to accelerate the handover procedure. The context information includes the anchor function entity information associated with the current MS.

Block 403: The serving context client provides local context information that is maintained by the serving context client itself.

Block 404: The serving context client requests another context information of the MS from the serving context server or the anchor context server via the context request message, and sends it to the serving handover control function entity, such that the context information, is sent while the context information is included in the handover request message sent from the serving handover control function entity.

In this solution, besides providing the local context information maintained by the serving context client itself, the serving context client further requests another context information of the MS from the serving context server or the anchor context server via the context request message, and sends it to the serving handover control function entity, such that the context information is sent while the context information is included in the handover request message sent from the serving handover control function entity.

Figure 5:
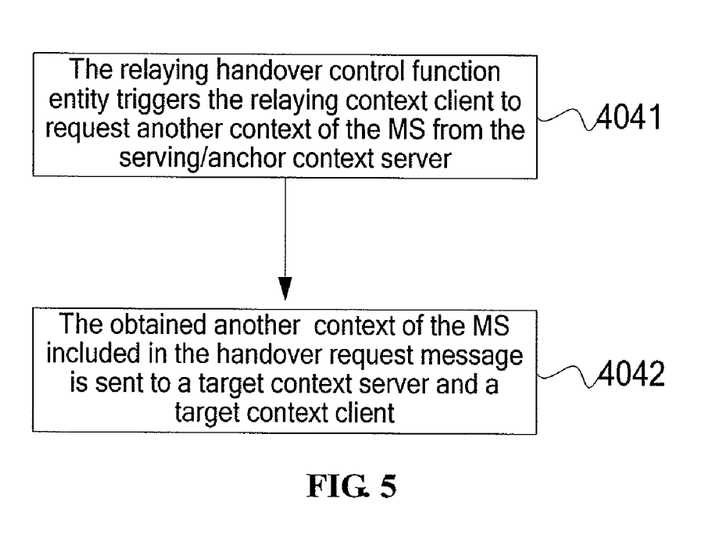
FIG. 5 is a detailed flowchart of block 404 in the flow shown in FIG. 4.

In the above block 404, besides obtaining the MS contexts by triggering the serving context server, the MS contexts can be obtained through triggering a relaying context function entity (relaying context client) by a relaying handover control function entity during the handover process. As shown in FIG. 5, block 404 further includes the following blocks.

Block 4041: After receiving the handover request message sent from the serving handover control function entity, the relaying handover control function entity triggers the corresponding relaying context client to request another context of the MS from the serving/anchor context server.

Block 4042: The obtained another context of the MS included in the handover request message is sent to a target context server and a target context client.

In the above process, as for the other MS contexts not maintained by the context client, after the handover request message arrives at the relaying handover control function entity, the relaying handover control function entity triggers the corresponding relaying context client to request the other MS contexts from the serving/anchor context server, and sends them to the target context server and the target context client included in the handover request message sent to the target handover control function entity through the relaying handover function.

Figure 6:
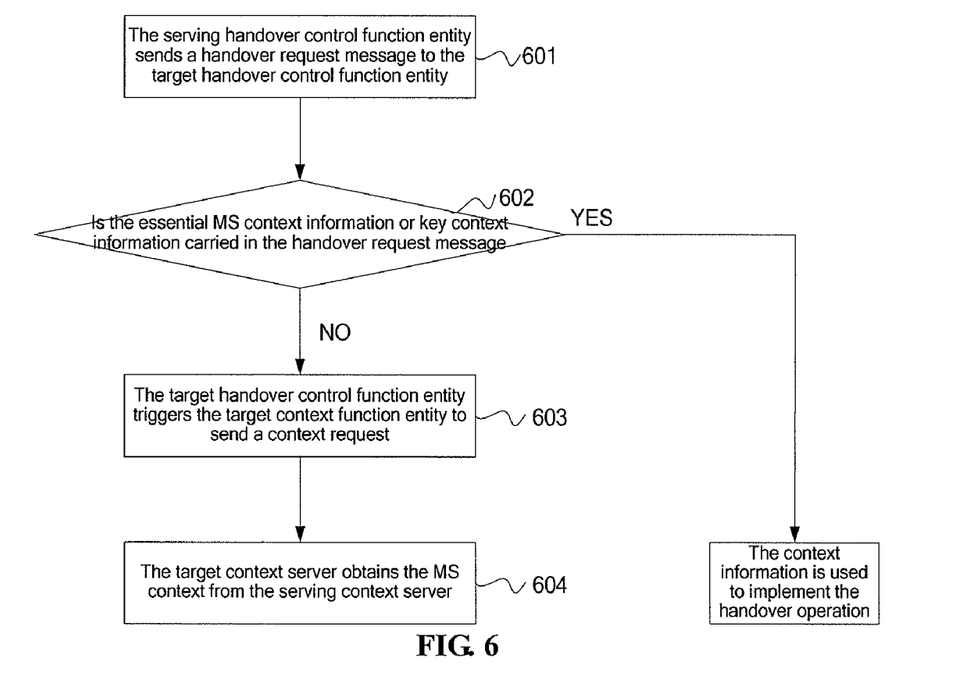
FIG. 6 is a flowchart of an MS context conveying process in a handover preparation stage according to another embodiment of the present invention.

In the handover preparation stage, the MS context information may be conveyed through another manner. The anchor function entity identification information acting on the MS is carried in the MS context. As shown in FIG. 6, the process mainly includes the following blocks.

Block 601: The serving handover control function entity sends a handover request message to the target handover control function entity.

Block 602: The target handover control function entity determines whether the essential MS context information or key context information is carried in the handover request message or not. If the essential MS context information or key context information is carried in the handover request message, the context information is directly used for the handover operation; if the essential MS context information or key context information is not carried in the handover request message, it proceeds to the block 603.

Block 603: The target handover control function entity triggers the target context function entity to send a context request.

In the handover preparation stage, after the handover request message sent from the handover control function entity on the serving BS side arrives at the handover control function entity on the target BS side, if no essential MS context information or key context information is carried in the received handover request message, the corresponding target context client function entity on the target BS side is triggered to send a context request message to the target context server, so as to obtain the essential MS context information.

Block 604: The target context function entity obtains the MS context from the serving context function entity.

The process further includes that the target context server obtains the MS context information from the serving context server or the anchor context server.

The MS context information conveyed in the above process may be merely part of the MS context, which is adapted to assist the handover process and provided for the target BS to determine whether the QoS requirement of the MS handover is supported or not. The remaining MS contexts may be conveyed to a target BS through a handover confirm message, after the MS selects the final target BS for the handover process.

In the above process, the MS context and corresponding key context may be conveyed in the handover confirm stage. After the serving BS receives a handover instruction message sent from the MS and the information indicating the finally selected target BS is carried therein, the handover control function entity in the serving BS sends a handover confirm message to the handover control function entity in the target BS, the MS context and corresponding key context are carried in the handover confirm message and transmitted to the target BS side.

In the above process, the conveying process of the MS context may include the conveying of the security context such as an AK and an AK context (AK sequence number), an uplink packet number of cipher-based message authentication code (CMAC_PN_U), a downlink packet number of cipher-based message authentication code (CMAC_PN_D), and the like. Meanwhile, considering the security requirement, the involved security context may be conveyed independently of the conveying of the remaining MS context, and conveyed by utilizing an exclusive AK transmission protocol, which occurs between the target BS and the anchor authenticator of the MS, but the instances and processes of the two conveying are consistent with each other.

In the above process, after the MS context and the security context, included in the handover request message or the handover confirm message, are received by the target handover control function entity on the target BS side and the associated target relaying handover control function entity, the target handover control function entity or the target relaying handover control function entity triggers the target context function entity (target context server) or target context function entity (target context client) to reserve the context it should reserve. Meanwhile, in this process, the target context server and the target context client may update or modify part of the context according to the local policy, and convey the updated information to the MS, or store the updated information in the target context server.

In the above process, the conveying of the MS contexts may occur during the handover process merely involved R3 link.

In the above process, the context client and the context server may store part of the MS context respectively.

The content of the contexts conveyed in the above-mentioned MS contexts conveying process may be different contexts according to different network realization structure. In other words, anchor function entity needed is different according to different network structure. For example, there is a handover controller centralized managed, such that anchor handover function controller identification may be transmitted in the MS handover context process. If the handover control function is distributed in an ASN GW or a BS, the anchor function entity identification is not needed.

Figure 7:
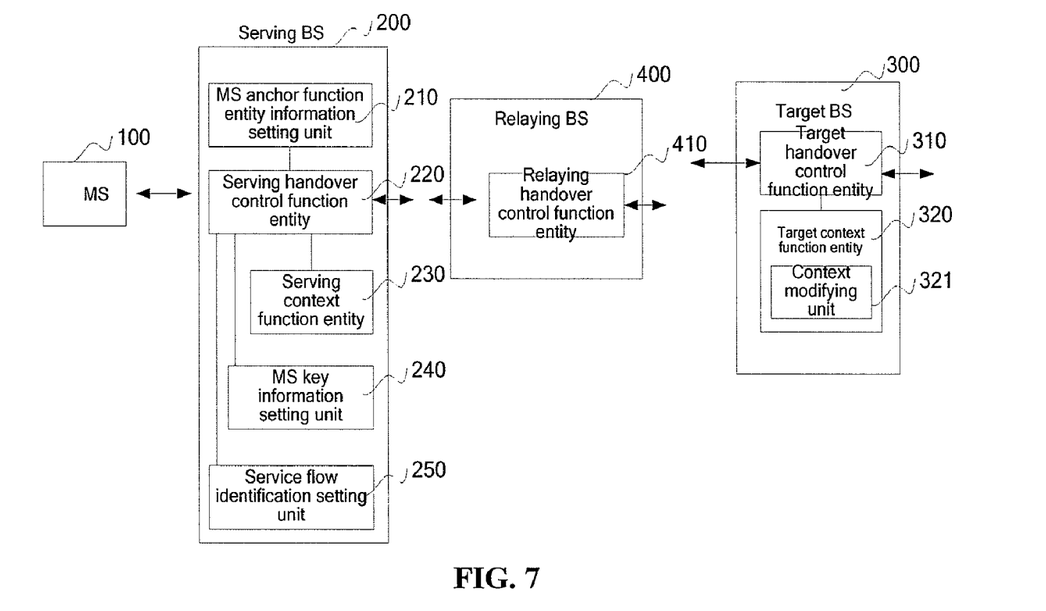
FIG. 7 is a schematic diagram of the base station part according to an embodiment of the present invention.

Referring to FIG. 1, a network structure for implementing the method of managing the MS according to an embodiment of the present invention includes an access service network (ASN) for providing an access for the MS, and a connectivity service network (CSN) for providing an IP connection service for the MS. The ASN includes a base station, and an access service network gateway. Some improvement is made in the base station part in this embodiment. As shown in FIG. 7, when the MS 100 is handed over, a serving base station (BS) 200, a target BS 300, and a relaying BS 400 are involved. The present invention disposes an MS anchor function entity information setting unit 210 in the above part.

The MS anchor function entity information setting unit 210 is located at the serving BS 200, and adapted to set the MS anchor function entity information in the MS context during the MS handover.

The CSN addresses the corresponding network function entity according to the MS anchor function entity information, and accomplishes the data path establishment and service transmission on the target network for the MS.

The serving BS 200 that provides an access for the MS currently is further configured with a serving handover control function entity 220 and a serving context function entity 230.

The serving handover control function entity 220 is adapted to control the MS handover and trigger the serving context function entity to provide an MS context.

The serving context function entity 230 is adapted to provide the context to the serving handover control function entity 220.

The target BS 300, where the MS is about to be handed over, is configured with a target handover control function entity 310 and a target context function entity 320.

The target handover control function entity 310 is adapted to control the MS handover operation.

The target context function entity 320 is adapted to store the MS context.

The serving BS 400 that provides relaying for the MS currently is configured with a relaying handover control function entity 410.

The relaying handover control function entity 410 is adapted to request a second context from the serving context function entity and send the second context to the target context function entity during the MS handover.

The system is further configured with an MS key information setting unit 240 and a service flow identification setting unit 250.

The MS key information setting unit 240 is located at the serving BS 200, and adapted to setting the corresponding key information of the MS in the context carried in the handover confirm message sent to the target handover function control entity from the serving handover control function entity.

The service flow identification setting unit 250 is located at the serving BS 200, and is adapted to set the service flow identification in the context during the MS handover.

The system is further configured with a context modifying unit 321.

The context modifying unit 321 is located at the target context function entity, and is adapted to update or modify the context according to the local policy, and send the updated or modified context to the MS and/or store the updated or modified context to the target context function entity.

Though illustration and description of the present disclosure have been given in conjunction with the exemplary embodiments thereof, it should be appreciated by persons of ordinary skill in the art that various changes in forms and details can be made without deviation from the spirit and scope of this disclosure, which are defined by the appended claims.

What is claimed is:

1. A method for managing a context of a mobile station, applied in a mobile station handover process of a wireless access network, comprising:

carrying anchor function entity identification information in the mobile station context; and addressing, by a service network connected with the mobile station, corresponding network function entities according to the anchor function entity identification information, to implement data path establishment and service transmission on a target network for the mobile station;

wherein the anchor function entity identification information comprises anchor data path function identification associated with the mobile station.

2. The method according to claim 1, wherein the anchor function entity identification information in the mobile station context further comprises one of following contents or any combination thereof:

anchor foreign agent identification associated with the mobile station;

anchor proxy mobile IP client identification associated with the mobile station;

anchor authenticator identification associated with the mobile station;

anchor paging controller identification associated with the mobile station;

anchor location register identification associated with the mobile station;

anchor service flow authorization identification associated with the mobile station;

anchor service flow management identification associated with the mobile station;

anchor radio resource controller identification associated with the mobile station;

anchor radio resource agent identification associated with the mobile station;
anchor context server identification associated with the mobile station;
anchor context client identification associated with the mobile station; and
anchor handover controller identification associated with the mobile station.

3. The method according to claim 2, wherein the mobile station context is conveyed in a mobile station handover preparation stage.

4. The method according to claim 3, wherein conveying the context in the handover preparation stage comprises:
triggering, by a serving handover control function entity, a serving context function entity to provide a mobile station context;
providing, by the serving context function entity, a first context to the serving handover control function entity, wherein the first context is a context of a mobile station maintained by the serving context function entity; and
obtaining, by the serving handover control function entity, a second context, wherein the second context is a context of a mobile station not maintained by the serving context function entity.

5. The method according to claim 4, wherein the obtaining, by the serving handover control function entity, a second context further comprises:
providing, by the serving context function entity, the second context to the serving handover control function entity; or
triggering, by a relaying handover function control entity, a relaying context function entity to request the second context from the serving context function entity; and
sending, by the relaying handover function control entity, the second context to a target context function entity.

6. The method according to claim 5, wherein the second context included in a handover request message is sent to a target handover control function entity.

7. The method according to claim 3, wherein conveying the context in the handover preparation stage comprises:
sending, by a serving handover control function entity, a handover request message to a target handover control function entity; and
triggering, by the target handover control function entity, a target context function entity to send a context request.

8. The method according to claim 7, further comprising:
obtaining, by the target context function entity, a mobile station context from the serving context function entity.

9. The method according to claim 2, wherein the context is conveyed in a mobile station handover performing stage.

10. The method according to claim 9, wherein the context is carried in a handover confirm message sent to a target handover control function entity from a serving handover control function entity.

11. The method according to claim 10, wherein key information corresponding to the mobile station is carried in the context.

12. The method according to claim 2, wherein the context comprises security context information, comprising one of the following contents or any combination thereof:
a master session key, a paired master key, a paired master key sequence number, an authorized key, an authorized key context, or a credential key between a mobile IP proxy mobile node and a mobile IP home agent.

13. The method according to claim 12, wherein the authorized key context comprises any one of the following:
an authorized key sequence number, an uplink packet number of cipher-based message authentication code, and a downlink packet number of cipher-based message authentication code.

14. The method according to claim 13, wherein the security context is transmitted between a target base station and an anchor authenticator of the mobile station through an authorization key transmission protocol.

15. The method according to claim 2, wherein the context comprises service flow identification.

16. The method according to claim 2, wherein the target context function entity reserves the context.

17. The method according to claim 16, further comprising updating or modifying, by the target context function entity, the context according to a local policy.

18. The method according to claim 17, further comprising sending, by the target context function entity, the updated or modified context to the mobile station.

19. The method according to claim 17, further comprising storing, by the target context function entity, the updated or modified context.

20. A system for managing a context of a mobile station, comprising: an access service network adapted to provide an access for a mobile station, and a connectivity service network adapted to provide an IP connection service for the mobile station, wherein the access service network comprises a base station, and an access service network gateway, and further comprising:
a mobile station anchor function entity information setting unit, adapted to set mobile station anchor function entity information in a mobile station context during a mobile station handover process; wherein the connectivity service network addresses corresponding network function entity according to the mobile station anchor function entity information, to accomplish data path establishment and service transmission on a target network for the mobile station;
wherein the mobile station anchor function entity information comprises anchor data path function identification associated with the mobile station.

21. The system according to claim 20, wherein
a serving base station, adapted to provide an access for the mobile station currently, is configured with:
a serving handover control function entity, adapted to control the mobile station handover process and trigger a serving context function entity to provide a mobile station context; and
the serving context function entity adapted to provide the context to the serving handover control function entity;
a target base station, to which the mobile station is about to be handed over, is configured with:
a target handover control function entity adapted to control mobile station handover operation; and
a target context function entity adapted to store the mobile station context.

22. The system according to claim 21, wherein a serving base station for providing relay for the mobile station is configured with:
a relaying handover control function entity adapted to request a second context from the serving context function entity and send the second context to the target context function entity during the mobile station handover process.

23. The system according to claim 21, further comprising:
a mobile station key information setting unit adapted to set corresponding key information of the mobile station in the context carried in a handover confirm message sent to the target handover control function entity from the serving handover control function entity.

24. The system according to claim 21, further comprising:
a service flow identification setting unit adapted to set service flow identification in the context during the mobile station handover process.

25. The system according to claim 21, further comprising:
a context modification unit, allocated at the target context function entity, and adapted to update or modify the context according to a local policy, and send the updated or modified context to the mobile station and/or store the updated or modified context to the target context function entity.

* * * * *